United States Patent [19]

Fujiki et al.

[11] Patent Number: 5,529,837
[45] Date of Patent: Jun. 25, 1996

[54] SILICONE COATED BASE MATERIAL AND AIR BAG BASE MATERIAL

[75] Inventors: Hironao Fujiki; Miyuki Tanaka, both of Gunma-ken, Japan

[73] Assignee: Shin-Etsu Chemical Co., Ltd., Tokyo, Japan

[21] Appl. No.: 394,486

[22] Filed: Feb. 27, 1995

[30] Foreign Application Priority Data

Feb. 28, 1994 [JP] Japan .................................. 6-054482

[51] Int. Cl.$^6$ ...................................................... B37B 7/00
[52] U.S. Cl. ........................ 428/266; 428/265; 428/267; 428/361; 428/368; 280/728.1
[58] Field of Search .................................. 428/266, 36.1, 428/36.8, 265, 267

[56] References Cited

U.S. PATENT DOCUMENTS 5,208,097   5/1993   Honma .................................. 428/266

FOREIGN PATENT DOCUMENTS 543401   5/1993   European Pat. Off. .
553840   8/1993   European Pat. Off. .

Primary Examiner—Ralph H. Dean
Attorney, Agent, or Firm—Millen, White, Zelano, & Branigan

[57] ABSTRACT

A material in the form of polyamide fibers, polyester fibers, woven and non—woven fabric thereof, thermoplastic elastomer, and polyurethane sheet is coated with a silicone coating composition to a thickness of 5 to 20 μm, obtaining a silicone coated base material. The silicone coating composition contains (A) an organopolysiloxane having at least two alkenyl groups, (B) an organohydrogenpolysiloxane having at least two hydrogen atoms, (C) an organic silicon compound having at least one hydrogen atom and at least one epoxy and/or trialkoxy-silyl group, (D) a carbon, $NiO_2$, FeO, $FeO_2$, $Fe_2O_3$, $Fe_3O_4$, $CoO_2$, $CeO_2$ or $TiO_2$ powder having a mean particle size of up to 20 μm, and (E) a platinum catalyst. The silicone coated base material is flame resistant and fully acceptable in practical use even though the silicone coating is as thin as 5 to 20 μm, namely less than about one-half of the conventional coating thickness.

19 Claims, No Drawings

SILICONE COATED BASE MATERIAL AND AIR BAG BASE MATERIAL

BACKGROUND OF THE INVENTION

1. Field of the Invention

This invention relates to a silicone coated base material having a silicone coating formed on a base material. It also relates to an air bag base material.

2. Prior Art

Most of coating compositions used for automotive air bags in the prior art are chloroprene resin blends. The chloroprene resin blends are also used in treating fibrous base materials in the form of woven, knitted and non-woven fabrics of polyamide fibers as by impregnation, coating or lamination. The resulting composite materials have excellent properties inherent to both the polyamide fibers and chloroprene resin and are useful in a variety of applications.

However, these composite materials have some drawbacks. They tend to gradually lose their strength when they are allowed to stand above a certain temperature over a long term because the chloroprene resin releases hydrogen chloride which acts to scissor amide bonds of the polyamide fibers. Since the chloroprene resin is relatively hard, the resin excessively restrains polyamide fibers of the fibrous base material in the composite material, preventing free motion of the fibers. Thus, the composite materials have a relatively hard feel or suitability and low tear strength.

To overcome these drawbacks, it was proposed to use coating compositions mainly comprising silicone resins which are superior to the chloroprene resins with respect to heat resistance, weathering, and flexibility. Typical known compositions are blends of a heat vulcanizable silicone resin and a tackifier and blends of an addition-curing type silicone rubber and a tackifier. These silicone coating compositions are applied to base materials of air bags, particularly for automobiles or the like to form coatings thereon which are generally about 40 μm thick. However, to meet a market demand for light weight, compact and low cost products, it is desirable to reduce the coating thickness.

As the coating thickness is reduced, the conventional coating compositions tend to increase in burn rate. When they are applied to air bags for such as automobiles, thin coatings permit the air bags to puncture upon explosive expansion of an inflator. As a result, the air bags lose air tightness and are thus impractical.

SUMMARY OF THE INVENTION

An object of the present invention is to provide a silicone coated base material which remains fully flame resistant even when a silicone coating is thinly formed. Another object of the present invention is to provide a silicone coated base material for use in air bags, particularly for automobiles, which maintains the air bag function upon explosive expansion of an inflator when a silicone coating is formed to a thickness of 5 to 20 μm. A further object of the present invention is to provide an air bag base material.

The present invention is directed to a silicone coating composition comprising (A) 100 parts by weight of an organopolysiloxane having at least two alkenyl groups each directly bonded to a silicon atom in a molecule, (B) an organohydrogenpolysiloxane having at least two hydrogen atoms each bonded to a silicon atom (i.e. SiH groups) in a molecule, in a sufficient amount to give 0.5 to 4 silicon-bonded hydrogen atoms per alkenyl group in component (A), (C) 0.1 to 10 parts by weight of an organic silicon compound having in a molecule at least one hydrogen atom bonded to a silicon atom and at least one epoxy and/or trialkoxysilyl group bonded to a silicon atom through a carbon atom directly bonded to the silicon atom, for example through an alkylene group such as methylene, ethylene, and propylene group, (D) 0.1 to 100 parts by weight of at least one powder having a mean particle size of up to 20 μm selected from the group consisting of carbon, $NiO_2$, FeO, $FeO_2$, $Fe_2O_3$, $Fe_3O_4$, $CoO_2$, $CeO_2$, and $TiO_2$, (E) a catalytic amount of a platinum catalyst, (F) up to 1 part by weight of benzotriazole and/or benzimidazole, and (G) 5 to 100 parts by weight of reinforcing silica. Note that components (F) and (G) are optional. This silicone coating composition is applied to a base material to form a coating of about 5 to 20 μm thick on at least a portion of the base material. The base material is selected from the group consisting of polyamide fibers, polyester fibers, woven and non-woven fabrics thereof, thermoplastic elastomers, and polyurethane sheets. Although the coating has a thickness of about 5 to 20 μm which is thinner than the conventional coatings of about 40 μm thick, the resulting silicone coated base material is fully flame resistant and acceptable in practical use. Particularly when this silicone coated base material is used in air bags, for example for automobiles, it can maintain the air bag function upon explosive expansion of an inflator.

Therefore the present invention provides a silicone coated base material comprising a base material and a coating of 5 to 20 μm thick formed thereon from a silicone coating composition comprising components (A) to (E), preferably further comprising components (F) and (G). The present invention also provides an air bag base material having a coating of the silicone coating composition.

DETAILED DESCRIPTION OF THE INVENTION

In the silicone coating composition according to the present invention, component (A) is an organopolysiloxane having at least two alkenyl groups each directly bonded to a silicon atom in a molecule. The organopolysiloxane (A) may have the following average compositional formula:

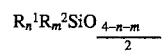

$$R^1_n R^2_m SiO_{\frac{4-n-m}{2}}$$

wherein $R^1$ represents an unsubstituted or substituted monovalent hydrocarbon group not containing aliphatically unsaturated bonds, $R^2$ represents an alkenyl group, and letters n and m are positive numbers satisfying the relationship: $0.7<n<2.2$, $0<m\leq0.1$ and $0.8<m+n\leq2.2$. It may take the form of a straight chain, branched, network or three-dimensional resinous structure or a mixture thereof. The organopolysiloxane (A) is preferably a straight chain diorgano-polysiloxane in which the main chain is composed basically of diorganosiloxane recurring units and end-blocked with triorganosilyl groups. The alkenyl groups are bonded to silicon atoms at molecule ends and/or in the intermediate portion of the main chain of the molecule. Preferably, the alkenyl groups are bonded to silicon atoms at both molecule ends from the viewpoint of a curing rate and a cured product physical property. The alkenyl group, preferably having 2 or 8 carbon atoms, bonded to a silicon atom and denoted by $R^2$ in the general compositional formula is exemplified by vinyl, allyl, 1-propenyl, isopropenyl, 1-butenyl, 3-butenyl, isobutenyl and hexenyl groups while the vinyl group is most preferred because of ease of synthesis and chemical stability. Organic groups bonded to a silicon atom other than the alkenyl group, which are denoted by $R^1$ in the general compositional formula include unsubstituted or substituted monovalent hydrocarbon groups other than those having an aliphatic unsaturated bond, and having 1 to 10 carbon atoms, for example, alkyl groups such as methyl, ethyl, propyl, isopropyl, butyl, isobutyl, tert-butyl, hexyl, octyl and decyl groups, aryl groups such as phenyl, tolyl, xylyl and naphthyl groups, cycloalkyl groups such as cyclohexyl, aralkyl groups such as benzyl and phenylethyl groups, halogen-substituted or cyano-substituted hydrocarbon groups such as chloromethyl, bromoethyl, trifluoropropyl and cyanoethyl groups. Preferably all organic groups other than alkenyl groups are methyl groups or a mixture of methyl and phenyl groups because of ease of synthesis and chemical stability. The organopolysiloxanes preferably have a viscosity of at least 100, generally 100 to 10,000,000 centistokes at 25° C., more preferably at least 500, for example, 500 to 1,000,000 centistokes at 25° C. With a viscosity of less than 100 centistokes, a cured product would be weak and brittle and a coated base material would become hard. With a viscosity of more than 10,000,000 cs, workability may become lowered and much diluting solvents may be required upon application by coating or screen printing. These siloxanes can be synthesized by conventional well-known processes.

Component (B) in the form of an organohydrogenpolysiloxane is an essential component for forming a silicone cured product having practically acceptable strength by undergoing addition reaction (i.e. hydro-silylation reaction) with alkenyl groups in component (A) in the presence of component (E) for curing the silicone coating composition. The organohydrogenpolysiloxane (B) may have the following average compositional formula:

$$R_a^3 H_b SiO_{\frac{4-a-b}{2}}$$

wherein $R^3$ represents an unsubstituted or substituted monovalent hydrocarbon group, and letters a and b are positive numbers satisfying the relationship: $0.5<a<2.2$, $0.002\leq b\leq 1$ and $0.8<a+b\leq 3$. The organohydrogen-polysiloxane should have at least two, preferably at least three hydrogen atoms each bonded to a silicon atom (i.e. SiH group) in a molecule. The hydrogen atoms are directly bonded to silicon atoms at molecule ends and/or in the intermediate portion of the main chain of the molecule. Its molecular structure is not critical and any of commonly available organohydrogenpolysiloxanes, for example, of a straight chain, branched, cyclic or three-dimensional resinous structure may be used. Organic groups bonded to a silicon atom, which are denoted by $R^3$ in the general compositional formula include unsubstituted or substituted monovalent hydrocarbon groups, preferably other than those having an aliphatic unsaturated bond, and having 1 to 10 carbon atoms, for example, alkyl groups such as methyl, ethyl, propyl, isopropyl, butyl, isobutyl, tert-butyl, hexyl, octyl and decyl groups, aryl groups such as phenyl, tolyl, xylyl and naphthyl groups, cycloalkyl groups such as cyclohexyl, aralkyl groups such as benzyl and phenylethyl groups, halogen-substituted or cyano-substituted hydrocarbon groups such as chloromethyl, bromoethyl, trifluoropropyl and cyanoethyl groups. Preferably all organic groups are methyl groups or a mixture of methyl and phenyl groups as in component (A). The organohydrogenpolysiloxanes preferably have a viscosity of up to 300, normally 0.1 to 300, more preferably 1 to 200 centistokes at 25° C. With a viscosity of more than 300 centistokes, compatibility with component (A) would sometimes be low.

Component (B) is used in such an amount that the amount of silicon-bonded hydrogen atoms (i.e. SiH groups) in component (B) is 0.5 to 4 equivalents, preferably 1 to 3 equivalents per alkenyl group in component (A). With less than 0.5 equivalent, cured products have low mechanical strength whereas an amount of more than 4 equivalents increases the likelihood of blowing upon curing.

Component (C) in the form of an organic silicon compound is an essential component for rendering silicone coatings adhesive to polyamide fibers, polyester fibers, woven and non-woven fabrics thereof, thermoplastic elastomers, and polyurethane sheets. There may be used any of organic silicon compounds, for example organosilanes and linear, cyclic or branched organo(poly)siloxanes, having in a molecule at least one, preferably two or more hydrogen atom(s) each bonded to a silicon atom (i.e. SiH groups) and at least one epoxy and/or trialkoxysilyl group bonded to a silicon atom through a carbon atom (for example, through an alkylene group such as methylene, ethylene, propylene, etc.) directly bonded to the silicon atom. Examples of the epoxy and trialkoxysilyl groups bonded to a silicon atom through a carbon atom include:

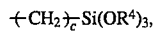

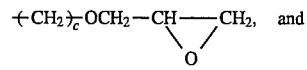

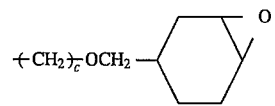

wherein $R^4$ is an alkyl group or alkoxy-substituted alkyl group having 1 to 4 carbon atoms, and letter c is 1, 2, 3 or 4. Those having a linear or cyclic polysiloxane skeleton are preferred because of ease of synthesis. In the cyclic polysiloxane skeleton, siloxane rings constructed by 3 to 6 silicon atoms, more preferably 4 silicon atoms are preferred for ease of synthesis. In the case of linear polysiloxane skeletons, siloxane chains are preferably constructed from about 5 to 50 silicon atoms, though not limited thereto, because higher molecular weights lead to higher viscosity and are inconvenient to synthesize or handle. Component (C) may have an organic group bonded to a silicon atom in addition to the hydrogen atom bonded to a silicon atom (SiH group) and the trialkoxysilyl group and/or the epoxy group. The organic group bonded to a silicon atom is an unsubstituted or substituted monovalent hydrocarbon group having 1 to 10 carbon atoms and preferably not containing aliphatically unsaturated bonds, as exemplified in $R^3$. These organic silicon compounds can be prepared by effecting partial addition reaction of an organic compound having an alkenyl group and an epoxy and/or trialkoxysilyl group to an organohydrogenpolysiloxane having at least three hydrogen atoms each attached to a silicon atom in a molecule in a conventional manner. The reaction mixture may be used simply after removing the unreacted compounds and addition reaction catalyst at the end of reaction. Desirably, the end product is isolated from the reaction mixture before use.

Examples of the organic silicon compound used as component (C) are those cyclic or linear organopolysiloxanes having the following structures.

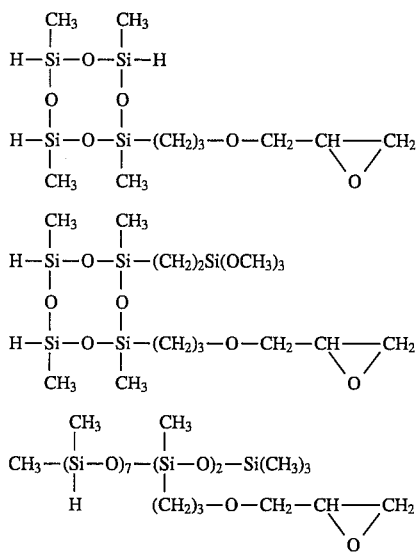

The amount of component (C) used is 0.1 to 10 parts, preferably 0.5 to 5 parts by weight per 100 parts by weight of component (A). On this basis, less than 0.1 part of component (C) fails to impart adhesion whereas more than 10 parts of component (C) incurs blowing upon curing and results in cured products having low mechanical strength.

Component (D) is to impart high-temperature resistance to the coated base material. It is carbon, $NiO_2$, FeO, $FeO_2$, $Fe_2O_3$, $Fe_3O_4$, $CoO_2$, $CeO_2$, $TiO_2$ or a mixture of two or more of them. It is in the form of finely divided powder particles having a mean particle size of up to 20 μm, normally of from 0.01 to 20 μm, preferably of from 0.02 to 10 μm, more preferably of from 0.02 to 1 μm. Particles with a mean particle size of more than 20 μm are inadequate for thin coatings which are as thin as 5 to 20 μm because the thin coatings become irregular on their surface. It may be difficult to obtain even particles having a mean particle size of less than 0.01 μm because agglomerates may not be so finely divided to give smaller size particles.

The amount of component (D) used is 0.1 to 100 parts, preferably 0.5 to 20 parts by weight per 100 parts by weight of component (A). On this basis, less than 0.1 part of component (D) is too small to contribute to high-temperature resistance whereas more than 100 parts of component (D) adversely affects the physical properties of cured coatings, resulting in coated base materials having insufficient physical properties.

A platinum catalyst is used as component (E) of the silicone coating composition according to the invention and is selected from platinum and platinum compounds which are commonly used in hydrosilylation reactions. Examples are platinum black, chloroplatinic acid, alcohol modified chloroplatinic acid, complexes of platinum with olefins or aldehydes, and complexes of platinum with vinylsiloxanes. Component (E) is used in a catalytic amount which may be properly adjusted in accordance with a desired curing rate. Often the platinum catalyst is used in an amount of 0.5 to 200 ppm, preferably 1 to 100 ppm of platinum atom based on the weight of components (A), (B) and (C) combined. With less than 0.5 ppm of the catalyst, short curing would result or curing would require a higher temperature and longer time. More than 200 ppm of the catalyst would make it difficult to control curing reaction and be costly.

If desired, benzotriazole and/or benz-imidazole is blended as component (F) in the silicone coating composition according to the invention. It is effective for further improving the high-temperature resistance of a silicone coated base material according to the invention. It is added in an amount of up to 1 part, normally 0.01 to 1 part, preferably of 0.05 to 0.5 part by weight per 100 parts by weight of component (A). Such minor amounts of the compound are fully effective for improving high-temperature resistance. More than 1 part of component (F) would often retard curing of a silicone coating composition which would become less effective in working. The objects of the invention can be achieved without component (F) although addition of component (F) ensures further improved high-temperature resistance.

It is also recommended to blend reinforcing silica as component (G) in the silicone coating composition according to the invention. The reinforcing silica is added for enhancing the mechanical strength of cured coatings and selected from well-known ones commonly used in conventional silicone rubbers. Preferably, the reinforcing silica has a specific surface area of more than 50 $m^2/g$, especially 50 to 500 $m^2/g$ by BET method. Examples include fumed silica, precipitated silica, fired silica, ground quartz and diatomaceous earth alone or in admixture of two or more. The reinforcing silica may be used as such. Preferably, it is treated with organic silicon compounds such as methylchlorosilanes, dimethylpolysiloxane, and hexamethyldisilazane for imparting smooth flow to a silicone coating composition. Component (G) is used in an amount of up to 100 parts, preferably 5 to 100 parts, more preferably 10 to 70 parts by weight per 100 parts by weight of component (A). Less than 5 parts of silica is often less effective for reinforcement whereas more than 100 parts of silica often adversely affects the flow and workability of a silicone coating composition.

In the silicone coating composition according to the invention, an adhesion promoter, reaction controller and other additives may be blended in addition to the above-mentioned components. Another type of organopolysiloxane may be further blended. Such additives which can be additionally blended include adhesion promoters, which is typically an organosilane compound (often referred to as a silane coupling agent) having two or three alkoxy groups and a functional group (e.g. alkenyl group, acryloxy group, methacryloxy group, glycidoxy group, etc.), such as vinyltrimethoxysilane, 3-methacryloxypropyl-trimethoxysilane, 3-acryloxypropyltrimethoxy-silane, and 3-glycidoxypropyltrimethoxysilane, reaction controllers such as methylvinylcyclo-polysiloxane, acetylene alcohols, and triallylisocyanurate, plasticizers such as non-functional dimethylpolysiloxane, and viscosity modifiers. Also, silicone resins consisting basically of $SiO_2$ and $R_3SiO_{1/2}$ units optionally also comprising $R_2SiO_{2/2}$ or $RSiO_{3/2}$ units (wherein R is a monovalent hydrocarbon group as defined in $R^2$), containing at least one alkenyl group such as vinyl group in a molecule and soluble in silicone oil may be used as a mechanical strength enhancer. These additives may be added in any desired amount as long as the objects of the invention are not impaired.

The silicone coating composition according to the invention can start curing in a state that all the components, especially components (A), (B) and (E) are mixed because component (E) promotes reaction between components (A) and (B). Therefore, it is recommended to add an effective reaction inhibitor, for example, triallylisocyanurate and acetylene alcohols or to divide the composition into two groups, that is, a major component group and a curing agent group so that all the components are uniformly mixed on use. The division into two groups is not particularly limited insofar as components (A), (B) and (E) are not present in a common group. For example, the composition is divided into a main group of (A) to (D) and a group of (E) or into a main group of part of (A)+(D)+(E) and a curing agent group of (B)+(C).

The silicone coating composition may be used in a solventless system, an aqueous emulsion system or a system diluted with an organic solvent such as toluene. In any case, the composition is usually adjusted to a viscosity of 1 to 50,000 centipoise, preferably 10 to 30,000 centipoise at 25° C. before it is applied to a base material (or substrates) selected from the group consisting of polyamide fibers, polyester fibers, woven and non-woven fabrics thereof, thermoplastic elastomers, and polyurethane sheets. A coating is formed to a dry thickness of about 5 to 20 μm. For the application purpose, coating, impregnation and spraying techniques are used. If the viscosity of the composition exceeds 50,000 centipoise, it is difficult to form a uniform coating of 5 to 20 μm thick. After application, the coating is generally cured by heating at 60° to 180° C. for 1/10 to 10 minutes.

In this way, there is obtained a silicone coated base material (or substrates) in which a base material (or substrates) selected from the group consisting of polyamide fibers, polyester fibers, woven and non-woven fabrics thereof, thermoplastic elastomers, and polyurethane sheets which are entirely or partially covered with a coating of the silicone coating composition to a thickness of 5 to 20 μm. Uniqueness resides in a composite combination of the above-defined silicone coating composition with various base materials (or substrates), typically fibrous base materials in the form of polyamide fibers, polyester fibers, woven and non-woven fabrics thereof.

More particularly, coatings of the silicone coating composition which are 5 to 20 μm thick, stand alone, will often readily burn. By combining such coatings with the above-mentioned base materials (or substrates), especially fibrous base materials, quite unexpectedly, the flame propagating rate and length can be reduced. There are obtained practically fully acceptable coated base materials although their coating thickness is less than about one-half of the conventional coating thickness. Therefore, the silicone coated base material according to the invention in which a coating of the silicone coating composition is formed on a fibrous base material is advantageously used as an air bag base material. When the fibrous base material is used to form an air bag, a silicone coating is normally formed on the entire surface of the fibrous base material, but may sometimes be formed on only that region of the fibrous base material which comes in contact with explosion residues of an inflator.

There has been described a silicone coated base material which is flame resistant and fully acceptable in practical use even though a coating of a silicone coating composition on a base material (or substrates) is as thin as 5 to 20 μm or less than about one-half of the conventional coating thickness.

EXAMPLE

Examples of the present invention are given below by way of illustration and not by way of limitation. All parts are by weight.

Example 1

A blend was prepared by uniformly kneading 54 parts of a dimethylpolysiloxane of the following average molecular formula (i) end-blocked with vinyldimethylsilyl groups at both molecule ends, and having a viscosity of 10,000 centistokes at 25° C., 16 parts of finely divided silica having a specific surface area of 300 m²/g (by BET method), and 3 parts of hexamethyl-disilazane, followed by heat treatment. This blend, 70 parts, was mixed with 30 parts of a dimethylpolysiloxane end-blocked with vinyldimethylsilyl groups at both molecule ends, and having a viscosity of 5,000 centistokes at 25° C., 2.0 parts of an epoxy-containing methylhydrogenpolysiloxane of the following molecular formula (ii), 2.0 parts of a methylhydrogenpolysiloxane of the following average molecular formula (iii) having a viscosity of 12 centistokes at 25° C., 10 parts of acetylene black having a mean particle size of 0.03 μm, and 0.2 part of a solution of platinum/vinylsiloxane complex in a both end vinyl-blocked dimethylpolysiloxane with platinum atom content of 1% by weight as a platinum catalyst, obtaining a mixture having a viscosity of 280 poise at 25° C.

The mixture was coated to a 210-denier nylon 66 fabric as a fibrous base material. For the coating purpose, a knife coater was used with a spacing of 20 μm set between the coater's knife edge and the fabric surface. The coating was vulcanized at 150° C. for 1 minute. The resulting coating was uniform and had a thickness of 18 μm.

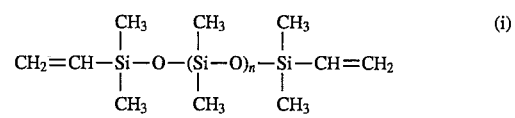

wherein letter n is such an integer that the organopolysiloxane has the viscosity defined above (or below).

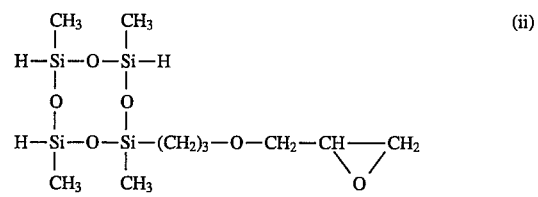

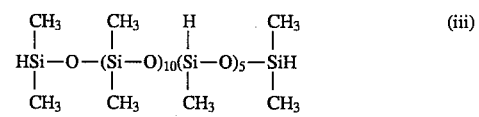

Comparative Example 1

A blend was prepared by uniformly kneading 54 parts of a dimethylpolysiloxane of average molecular formula (i) end-blocked with vinyldimethylsilyl groups at both molecule ends, and having a viscosity of 10,000 centistokes at 25° C., 16 parts of finely divided silica having a specific area of 300 m²/g (BET method), and 3 parts of hexamethyldisilazane, followed by heat treatment. This blend, 70 parts, was mixed with 30 parts of a dimethylpolysiloxane end-blocked with vinyldimethylsilyl groups at both molecule ends, and having a viscosity of 5,000 centistokes at 25° C., 2.0 parts of an epoxy containing methylhydrogenpolysiloxane of molecular formula (ii), 2.0 parts of a methylhydrogenpolysiloxane of average molecular formula (iii), and 0.2 part of a solution of platinum/vinylsiloxane complex in a both end vinyl-blocked dimethylpolysiloxane with platinum atom content of 1% by weight as a platinum catalyst, obtaining a mixture having a viscosity of 280 poise at 25° C.

The mixture was coated to a 210-denier nylon 66 fabric as a fibrous base material. For the coating purpose, a knife coater was used with a spacing of 50 μm set between the coater's knife edge and the fabric surface. The coating was vulcanized at 150° C. for 1 minute. The resulting coating was uniform and had a thickness of 45 μm, which is corresponding to those thickness of air-bag coatings in the prior art.

Comparative Example 2

The same mixture as in Comparative Example 1 was coated to a 210-denier nylon 66 fabric. For the coating purpose, a knife coater was used with a spacing of 20 μm set between the coater's knife edge and the fabric surface. The coating was vulcanized at 150° C. for 1 minute. The resulting coating was uniform and had a thickness of 18 μm.

Example 2

A blend was prepared by uniformly kneading 80 parts of a dimethylpolysiloxane of average molecular formula (i) end-blocked with vinyldimethylsilyl groups at both molecule ends, and having a viscosity of 10,000 centistokes at 25° C., 20 parts of finely divided silica having a specific surface area of 300 m²/g (BET method), and 3 parts of hexamethyldisilazane, followed by heat treatment. This blend, 100 parts, was mixed with 2.0 parts of a trimethoxysilyl-containing and epoxy-containing methyl-hydrogenpolysiloxane of the following molecular formula (iv), 2.0 parts of an methylhydrogen-polysiloxane of average molecular formula (iii), 5 parts of $Fe_2O_3$ having a mean particle size of 0.16 μm, 0.2 part of benzimidazole, and 0.2 part of a solution of platinum/vinylsiloxane complex in a both end vinyl-blocked dimethyl-polysiloxane with platinum atom content of 1% by weight as a platinum catalyst. To the resulting mixture was added 120 parts of toluene. Uniform dissolution yielded a mixture having a viscosity of 80 poise at 25° C.

The mixture was spray coated to a 210-denier nylon 66 fabric as a fibrous base material. The coating was heated at 80° C. for 5 minutes for evaporating off the solvent and then heat cured at 150° C. for 1 minute. The resulting coating was uniform and had a thickness of 5 μm.

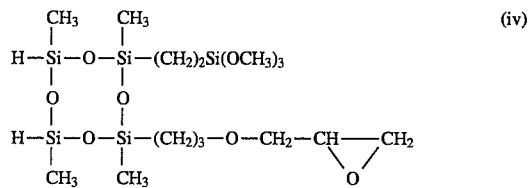

(iv)

Example 3

A 210-denier nylon 66 fabric was impregnated with the same mixture as in Example 2. The impregnated fabric was heated at 80° C. for 5 minutes for evaporating off the solvent and then heat cured at 150° C. for 1 minute. The resulting silicone coating was uniform and had a thickness of 10 μm.

Example 4

By repeating the procedure of Example 2 except that the benzimidazole was omitted, a mixture having a viscosity of 80 poise at 25° C. was obtained.

The mixture was spray coated to a 210-denier nylon 66 fabric as a fibrous base material. The coating was heated at 80° C. for 5 minutes for evaporating off the solvent and then heat cured at 150° C. for 1 minute. The resulting coating was uniform and had a thickness of 5 μm.

Next, the silicone coated base materials of the foregoing Examples and Comparative Examples were subject to a burning test according to the U.S. Federal Motor Vehicle Safety Standards "FVMS-302". As a control (Comparative Example 3), the nylon fabric used in the Examples, but without a coating was subject to the same burning test. The results are shown in Table 1.

TABLE 1

|  | E1 | E2 | E3 | E4 | CE1 | CE2 | CE3 |
|---|---|---|---|---|---|---|---|
| Coating thickness | 18 μm | 5 μm | 10 μm | 5 μm | 45 μm | 18 μm | 0 |
| Flame propagating time (sec.) | 20 | 18 | 22 | 25 | 33 | 107 | 205 |
| Flame propagating length (mm) | 3 | 4 | 4 | 10 | 5 | 92 | 170 |
| Burn rate (mm/sec.) | 9 | 13 | 11 | 24 | 9 | 52 | 50 |

Note that the burn rate is defined by the following equation.

Burn rate=60×(flame propagating length/flame propagating time)

As seen from Table 1, the uncoated fabric of Comparative Example 3 burned as if it melted and partially dripped. The coated fabric of Comparative Example 2 did not drop molten drips as in Comparative Example 3, but instead, continued burning for a longer time. Examples 1 to 4 exhibited a combustion level comparable to Comparative Example 1 having a conventional coating thickness.

Japanese Patent Application No. 6-54482 is incorporated herein by reference.

Although some preferred embodiments have been described, many modifications and variations may be made thereto in the light of the above teachings. It is therefore to be understood that within the scope of the appended claims, the invention may be practiced otherwise than as specifically described.

We claim:

1. A silicone coated base material comprising a base material selected from the group consisting of polyamide fibers, polyester fibers, woven and non-woven fabrics thereof, thermoplastic elastomers, and polyurethane sheets and a coating formed on at least a portion of said base material to a thickness of 5 to 20 μm, said coating being the cured product of a silicone coating composition comprising (A) 100 parts by weight of an organo-polysiloxane having at least two alkenyl groups each directly bonded to a silicon atom in a molecule, (B) an organohydrogenpolysiloxane having at least two hydrogen atoms each bonded to a silicon atom in a molecule, in a sufficient amount to give 0.5 to 4 silicon-bonded hydrogen atoms per alkenyl group in component (A), (C) 0.1 to 10 parts by weight of an organic silicon compound having in a molecule at least one hydrogen atom bonded to a silicon atom and at least one epoxy and/or trialkoxysilyl group bonded to a silicon atom through a carbon atom directly bonded to the silicon atom, (D) 0.1 to 100 parts by weight of at least one powder having a mean particle size of up to 20 μm selected from the group consisting of carbon, $NiO_2$, $FeO$, $FeO_2$, $Fe_2O_3$, $Fe_3O_4$, $CoO_2$, $CeO_2$, and $TiO_2$, and (E) a catalytic amount of a platinum catalyst.

2. The silicone coated base material of claim 1 wherein said silicone coating composition further contains (F) up to 1 part by weight of benzotriazole and/or benzimidazole.

3. The silicone coated base material of claim 1 wherein said silicone coating composition further contains (G) up to 100 parts by weight of reinforcing silica.

4. An air bag base material wherein a coating of the silicone coating composition of claim 1, is formed on a fibrous base material selected from the group consisting of polyamide fibers, polyester fibers, and woven and non-woven fabrics thereof.

5. The silicone coated base material of claim 1, which is in the form of an air bag for use in an automobile.

6. The silicone coated base material of claim 5, wherein the entire inner surface of the air bag is coated with the coating.

7. The silicone coated base material of claim 1, wherein the organopolysiloxane, (A), is of the following average compositional formula:

$$R^1_n R^2_m SiO_{(4-n-m)/2}$$

wherein $R^1$ is a halo- or cyano-substituted or unsubstituted monovalent hydrocarbon group of 1 to 10 carbon atoms not containing aliphatically unsaturated bonds, $R^2$ is an alkenyl group of 2 to 8 carbon atoms and letters n and m are positive numbers satisfying the relationships: $0.7<n<2.2$, $0<m\ 0.1$ and $0.8<m+n\leq2.2$.

8. The silicone coated base material of claim 1, wherein the organopolysiloxane, (A), is a straight chain diorganopolysiloxane end-blocked with triorganosilyl groups.

9. The silicone coated base material of claim 1, wherein the organopolysiloxane, (A), is a straight chain diorganopolysiloxane with alkenyl groups bonded to the silicon atoms at both ends of the molecule.

10. The silicone coated base material of claim 1, wherein the organohydrogenpolysiloxane, (B), is of the following average compositional formula:

$$R^3_a H_b SiO_{(4-a-b)/2}$$

wherein $R^3$ is a halo- or cyano-substituted or unsubstituted monovalent hydrocarbon group of 1 to 10 carbon atoms not containing aliphatically unsaturated bonds and letters a and b are positive numbers satisfying the relationships: $0.5<a<2.2$, $0.002\leq b\leq1$ and $0.8<a+b\leq3$.

11. The silicone coated base material of claim 1, wherein the epoxy or trialkoxysilyl group in component (C) is of one of the following formulae:

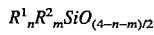$Si(OR^4)_3$,

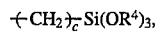 and

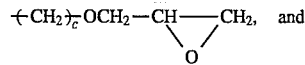

12. The silicone coated base material of claim 1, wherein the organic silicon compound, (C), has a linear or cyclic polysiloxane skeleton.

13. The silicone coated base material of claim 12, wherein the organic silicon compound, (C), has a linear polysiloxane skeleton of about 5 to 50 silicon atoms.

14. The silicone coated base material of claim 12, wherein the organic silicon compound, (C), has a cyclic polysiloxane skeleton with siloxane rings of 3 to 6 silicon atoms.

15. The silicone coated base material of claim 1, wherein the organic silicon compound, (C), is of the one of the following formulae:

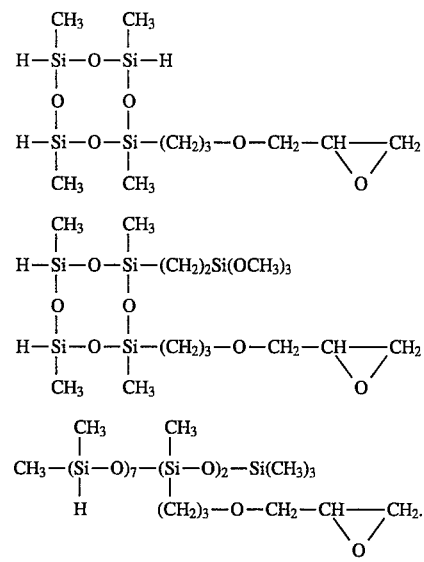

16. The silicone coated base material of claim 1, wherein the powder, (D), has a mean particle size of 0.02 to 10 μm.

17. The silicone coated base material of claim 1, wherein the silicone coating composition is solventless.

18. The silicone coated base material of claim 1, wherein the silicone coating composition is an aqueous emulsion system.

19. The silicone coated base material of claim 1, wherein the silicone coating composition further comprises benzimidazole for improving the high-temperature resistance.

* * * * *